(12) United States Patent
Boek et al.

(10) Patent No.: US 11,572,303 B2
(45) Date of Patent: Feb. 7, 2023

(54) TINTED ALUMINOSILICATE GLASS COMPOSITIONS AND GLASS ARTICLES INCLUDING SAME

(71) Applicant: CORNING INCORPORATED, Corning, NY (US)

(72) Inventors: Heather Debra Boek, Corning, NY (US); Timothy James Kiczenski, Corning, NY (US); Lisa Anne Tietz Moore, Corning, NY (US); Natesan Venkataraman, Painted Post, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 1103 days.

(21) Appl. No.: 16/098,690

(22) PCT Filed: May 4, 2017

(86) PCT No.: PCT/US2017/030953
§ 371 (c)(1),
(2) Date: Nov. 2, 2018

(87) PCT Pub. No.: WO2017/192794
PCT Pub. Date: Nov. 9, 2017

(65) Prior Publication Data
US 2021/0238079 A1   Aug. 5, 2021

Related U.S. Application Data

(60) Provisional application No. 62/331,803, filed on May 4, 2016.

(51) Int. Cl.
*C03C 3/091* (2006.01)
*C03C 3/087* (2006.01)
(Continued)

(52) U.S. Cl.
CPC .............. *C03C 3/091* (2013.01); *B32B 17/06* (2013.01); *C03C 1/10* (2013.01); *C03C 4/02* (2013.01);
(Continued)

(58) Field of Classification Search
CPC ........... C03C 3/087; C03C 3/091; C03C 1/10
See application file for complete search history.

(56) References Cited

U.S. PATENT DOCUMENTS 3,543,074 A   11/1970  Turner et al.
3,737,294 A    6/1973  Dumbaugh, Jr. et al.
(Continued)

FOREIGN PATENT DOCUMENTS

CN   103459338 A   12/2013
CN   104220386 A   12/2014
(Continued)

OTHER PUBLICATIONS

Chinese Patent Application No. 201780027818.4, Office Action dated May 14, 2021, 10 pages (4 pages of English Translation and 6 pages of Original Document), Chinese Patent Office.
(Continued)

*Primary Examiner* — Karl E Group
(74) *Attorney, Agent, or Firm* — Daniel J. Greenhalgh

(57) ABSTRACT

A tinted glass composition and glass article including the same, the composition including: about 45 mol % to about 80 mol % $SiO_2$; about 6 mol % to about 22 mol % $Al_2O_3$; 0 mol % to about 25 mol % $B_2O_3$; about 7 mol % to about 25 mol % of at least one alkaline earth oxide selected from MgO, CaO, SrO, BaO, and combinations thereof; about 0.5 mol % to about 20 mol % CuO; 0 mol % to about 6 mol % $SnO_2$, SnO, or a combination thereof; 0 mol % to about 1.0
(Continued)

mol % C; 0 mol % to about 5 mol % La$_2$O$_3$; and 0 mol % to about 10 mol % PbO, and that is substantially free of alkali metal.

20 Claims, 5 Drawing Sheets

(51) Int. Cl.
*C03C 1/10* (2006.01)
*B32B 17/06* (2006.01)
*C03C 4/02* (2006.01)

(52) U.S. Cl.
CPC ....... *B32B 2250/03* (2013.01); *B32B 2250/40* (2013.01); *B32B 2315/08* (2013.01); *B32B 2457/00* (2013.01)

(56) References Cited

U.S. PATENT DOCUMENTS

| | | | |
|---|---|---|---|
| 3,746,526 A | 7/1973 | Giffon | |
| 3,849,097 A | 11/1974 | Giffen et al. | |
| 3,902,881 A | 9/1975 | Pirooz | |
| 3,931,438 A | 1/1976 | Beall et al. | |
| 4,102,664 A | 7/1978 | Dumbaugh, Jr. | |
| 4,214,886 A | 7/1980 | Shay et al. | |
| 4,788,165 A * | 11/1988 | Fong | H05K 3/105 257/E23.009 |
| 4,898,767 A * | 2/1990 | Fong | C03C 17/06 428/210 |
| 5,281,562 A | 1/1994 | Araujo et al. | |
| 5,342,426 A | 8/1994 | Dumbaugh, Jr. | |
| 5,559,060 A | 9/1996 | Dumbaugh, Jr. et al. | |
| 7,201,965 B2 | 4/2007 | Gulati et al. | |
| 7,514,149 B2 | 4/2009 | Bocko et al. | |
| 8,007,913 B2 | 8/2011 | Coppola et al. | |
| 8,413,466 B2 | 4/2013 | Takaya et al. | |
| 9,023,744 B2 | 5/2015 | Kawaguchi et al. | |
| 2013/0133369 A1 | 5/2013 | Lock | |
| 2013/0136909 A1 | 5/2013 | Mauro et al. | |
| 2014/0049708 A1 | 2/2014 | Murata et al. | |
| 2014/0079807 A1 | 3/2014 | Borrelli et al. | |
| 2014/0242375 A1 | 8/2014 | Mauro et al. | |
| 2015/0010739 A1 | 1/2015 | Mauro et al. | |
| 2015/0037552 A1 | 2/2015 | Mauro | |
| 2015/0037553 A1 | 2/2015 | Mauro et al. | |
| 2015/0375475 A1 | 12/2015 | Cook | |
| 2017/0129218 A1 | 5/2017 | Cleary et al. | |
| 2018/0162768 A1 | 6/2018 | Boek et al. | |

FOREIGN PATENT DOCUMENTS

| | | | | |
|---|---|---|---|---|
| CN | 105377550 | A | 3/2016 | |
| DE | 102004001729 | A1 | 8/2005 | |
| JP | 2137746 | A | 5/1990 | |
| JP | 06-166538 | A | 6/1994 | |
| JP | H11-209143 | A | 8/1999 | |
| JP | 2000001331 | A | 1/2000 | |
| JP | 2002003240 | A | 1/2002 | |
| JP | 2007308330 | A | 11/2007 | |
| JP | 2014-512324 | A | 5/2014 | |
| JP | 2015-505804 | A | 2/2015 | |
| JP | 2015-512851 | A | 4/2015 | |
| JP | 2015-512852 | A | 4/2015 | |
| JP | 2015-516930 | A | 6/2015 | |
| SU | 510444 | A * | 12/1977 | ......... C03C 10/0045 |
| TW | 201438894 | A | 10/2014 | |
| WO | 2013058384 | A1 | 4/2013 | |
| WO | 2016/129255 | A1 | 8/2016 | |

OTHER PUBLICATIONS

Bring et al; "Colour Development in Copper Ruby Alkali Silicate Glasses. Part 1. The Impact of Tin (II) Oxide, Time and Temperature"; Glass Technol: Eur. J. Glass Sci. Technol. A, Apr. 2007, 48 (2) pp. 101-108.

Bring et al; "Colour Development in Copper Ruby Alkali Silicate Glasses. Part 2. The Effect of Tin (II) Oxide and Antimony (III) Oxide"; Glass Technol: Eur. J. Glass Sci. Technol. A, Jun. 2007, 48 (3) pp. 142-148.

International Search Report and Written Opinion of the International Searching Authority; PCT/US2017/030953; dated Jun. 30, 2017; 13 Pages; European Patent Office.

Taiwanese Patent Application No. 106114778, Office action dated Jan. 18, 2021 3 pages (English Translation Only); Taiwanese Patent Office.

Japanese Patent Application No. 2018-557924 Office Action dated Mar. 17, 2021, 9 pages (5 pages of English Translation and 4 pages of Original Document); Japanese Patent Office.

Chinese Patent Application No. 201780027818.4, Office Action dated Nov. 18, 2021, 16 pages (10 pages of English Translation and 6 pages of Original Copy), Chinese Patent Office.

\* cited by examiner

TINTED ALUMINOSILICATE GLASS COMPOSITIONS AND GLASS ARTICLES INCLUDING SAME

This application claims the benefit of priority under 35 U.S.C. § 371 of International Application No. PCT/US2017/030953, filed May 4, 2017, which claims the benefit of priority to U.S. Application No. 62/331,803, filed May 4, 2016, the content of each of which is incorporated herein by reference in its entirety.

BACKGROUND

Field

This disclosure relates to tinted aluminosilicate glass compositions and glass articles including the same, and more particularly, to alkali-free aluminosilicate glass compositions that include copper as a tinting agent.

Technical Background

A variety of different materials can be added to a glass sheet to impart a desired tint or color to the glass sheet. However, glasses of certain colors are difficult to manufacture and/or require costly tinting agents. For example, forming red glass often requires the use of costly tinting agents, such as Au, Ag, or Nd, or the use of toxic tinting agents, such as U, CdS, CdSe, or Se. In addition, tinted glasses are generally formed of an alkali glass material, which may not be compatible with some applications, such as electronics applications. Accordingly, there is a need for alkali-free glass compositions that include inexpensive and safe tinting agents.

SUMMARY

According to various embodiments, provided are alkali-free aluminosilicate glass compositions comprising copper as a tinting agent, and glass articles comprising the glass composition. The glass articles may be sheets of the glass composition, or may be laminated glass articles that include a glass core layer and one or more glass cladding layers fused to the glass core layer. At least one of the glass core layer or the glass cladding layer or layers of the laminated glass articles comprises the glass composition.

According to various embodiments, provided are tinted glass compositions comprising: on an oxide basis: about 45 mol % to about 80 mol % $SiO_2$; about 6 mol % to about 22 mol % $Al_2O_3$; 0 mol % to about 25 mol % $B_2O_3$; about 7 mol % to about 25 mol % of at least one alkaline earth oxide selected from the group consisting of MgO, CaO, SrO, BaO, and combinations thereof; about 0.5 mol % to about 20 mol % CuO; 0 mol % to about 6 mol % $SnO_2$, SnO, or a combination thereof; 0 mol % to about 1 mol % C; 0 mol % to about 5 mol % $La_2O_3$; and 0 mol % to about 10 mol % PbO, and that is free or substantially free of alkali metal.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
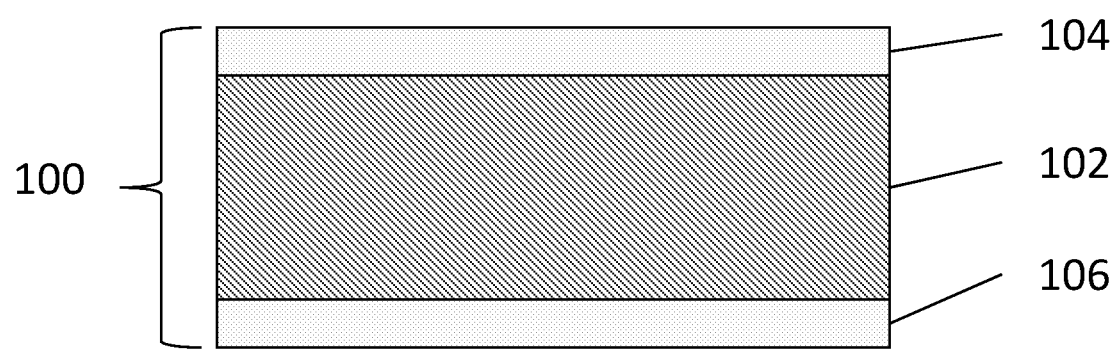
FIG. 1 is a cross-sectional view of an exemplary glass article, according to various embodiments of the present disclosure.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion" refers to the average coefficient of linear thermal expansion of a given material or layer between 0° C. and 300° C. As used herein, the term "coefficient of thermal expansion" refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

Herein, glass compositions are expressed in terms of mol % amounts of particular components included therein on an oxide bases unless otherwise indicated. Any component having more than one oxidation state may be present in a glass composition in any oxidation state. However, concentrations of such component are expressed in terms of the oxide in which such component is at its lowest oxidation state unless otherwise indicated. Component amounts may be provided as ranges, and end points of different ranges for a given component may be combined to define an amount range for the given component. Herein, elements having more than one oxidation state may be present in a glass composition in any oxidation state thereof.

In various embodiments, a glass article comprises at least a first layer and a second layer. For example, the first layer comprises a core layer, and the second layer comprises one or more cladding layers adjacent to the core layer. The core layer and the cladding layer may be relative terms. At least one layer of the glass article comprises a tinted layer. The tinted layer comprises one or more tinting agents configured to impart a tint or color to the tinted layer. The first layer and/or the second layer may be glass layers comprising a glass, a glass-ceramic, or a combination thereof. In some embodiments, the first layer and/or the second layer may be transparent glass layers. For example, the first layer and/or the second layer comprises an average transmittance of at least about 70%, at least about 75%, at least about 80%, at least about 85%, at least about 90%, at least about 95%, at least about 98%, or at least about 99% over a wavelength range of about 400 nm to about 750 nm. In some embodiments, the first layer and/or the second layer comprise opal glass that may be translucent or opaque. The glass article can comprise a glass sheet or a shaped glass article comprising a suitable 3-dimensional (3D) shape. In some embodiments, an average coefficient of thermal expansion (CTE) of the first layer is greater than an average CTE of the second layer. Such a CTE mismatch can aid in strengthening the glass article.

FIG. 1 is a cross-sectional view of an exemplary embodiment of a laminate glass article 100 that comprises laminated glass layers. The glass article 100 can be planar or substantially planar as shown in FIG. 1, or may be non-planar. For example, the glass article 100 may be molded or shaped. The glass article 100 comprises a first layer and a second layer. In the embodiment shown in FIG. 1, the first layer comprises a core layer 102, and the second layer comprises a first cladding layer 104 and a second cladding layer 106. The core layer 102 is disposed between the first cladding layer 104 and the second cladding layer 106. In some embodiments, the first cladding layer 104 and the second cladding layer 106 may be exterior layers, as shown in FIG. 1. In other embodiments, the first cladding layer 104 and/or the second cladding layer 106 may be intermediate layers disposed between the core layer 102 and an exterior layer.

The core layer 102 comprises a first major surface and a second major surface opposite the first major surface. In some embodiments, the first cladding layer 104 is fused to the first major surface of the core layer 102. Additionally, or alternatively, the second cladding layer 106 is fused to the second major surface of the core layer 102. In such embodiments, the interfaces between the first cladding layer 104 and the core layer 102 and/or between the second cladding layer 106 and the core layer 102 may be free of any bonding material such as, for example, a polymer interlayer, an adhesive, a coating layer, or any non-glass material added or configured to adhere the respective cladding layers to the core layer. Thus, the first cladding layer 104 and/or the second cladding layer 106 may be fused directly to the core layer 102, or may be directly adjacent to core layer 102.

In various exemplary embodiments, the glass article 100 may comprise one or more intermediate layers disposed between the core layer 102 and the first cladding layer 104, and/or between the core layer 102 and the second cladding layer 106. For example, the intermediate layers comprise intermediate glass layers and/or diffusion layers formed at the interface of the core layer 102 and the cladding layers 104, 106. The diffusion layer can comprise a blended region comprising components of each layer adjacent to the diffusion layer. Thus, two directly adjacent glass layers may be fused at the diffusion layer. In some embodiments, glass article 100 comprises a glass-glass laminate (e.g., an in-situ fused multilayer glass-glass laminate) in which the interfaces between directly adjacent glass layers are glass-glass interfaces.

In some embodiments, the core layer 102 comprises a first glass composition, and the first and/or second cladding layers 104, 106 comprise a second glass composition that is different than the first glass composition. For example, in the embodiment shown in FIG. 1, the core layer 102 comprises the first glass composition, and each of the first and second cladding layers 104, 106 comprises the second glass composition. In other embodiments, the first cladding layer 104 comprises the second glass composition, and the second cladding layer 106 comprises a third glass composition that is different than the first glass composition and/or the second glass composition.

The glass article 100 can be formed using a suitable process such as, for example, a fusion draw, down draw, slot draw, up draw, or float process. The various layers of the glass article can be laminated during forming of the glass article 100 or formed independently and subsequently laminated to form the glass article 100. In some embodiments, the glass article is formed using a fusion draw process.

Figure 2:
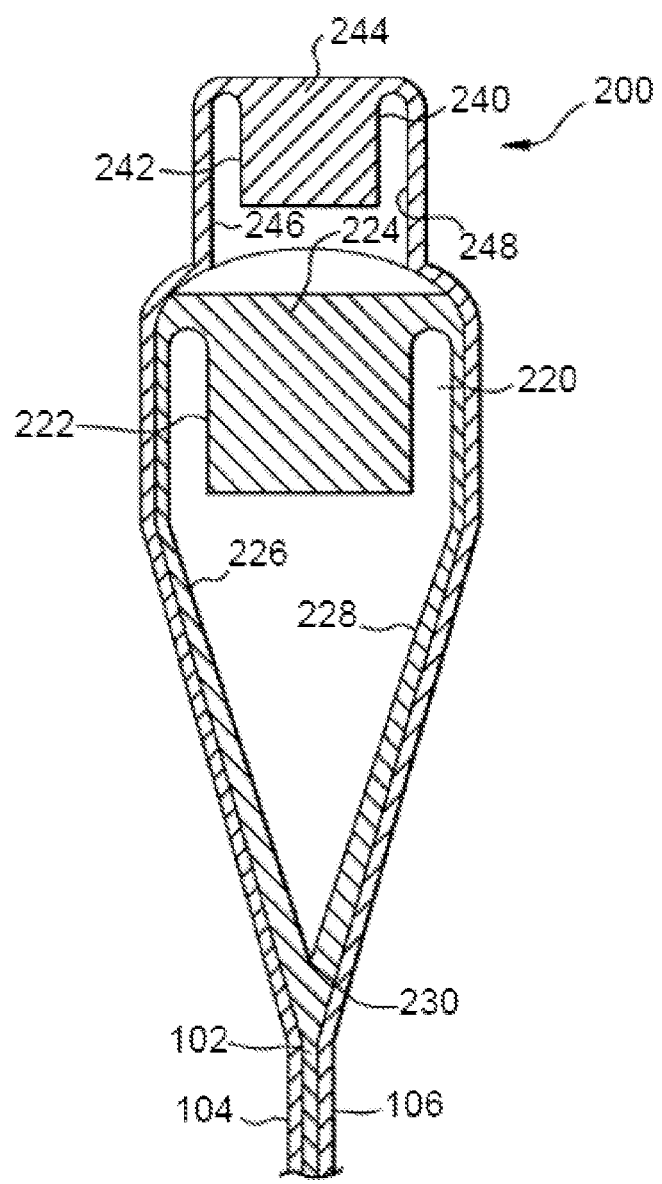
FIG. 2 is a cross-sectional view of one exemplary embodiment of an overflow distributor that can be used to form an exemplary glass article, according to various embodiments of the present disclosure.

FIG. 2 is a cross-sectional view of one exemplary embodiment of an overflow distributor 200 that can be used to form a glass article such as, for example, glass article 100. The overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into the trough 222 in a viscous state. The first glass composition 224 forms core layer 102 of the glass article 100 as further described below. The upper overflow distributor 240 comprises a trough 242. A second glass composition 244 is melted and fed into the trough 242 in a viscous state. The second glass composition 244 forms first and second cladding layers 104 and 106 of glass article 100 as further described below.

The first glass composition 224 overflows trough 222 and flows down opposing outer forming surfaces 226 and 228 of the lower overflow distributor 220. The outer forming surfaces 226 and 228 converge at a draw line 230. The separate streams of first glass composition 224 flowing down respective outer forming surfaces 226 and 228 of the lower overflow distributor 220 converge at the draw line 230, where they are fused together to form the core layer 102 of the glass article 100.

The second glass composition 244 overflows the trough 242 and flows down opposing outer forming surfaces 246 and 248 of the upper overflow distributor 240. The second glass composition 244 is deflected outward by the upper overflow distributor 240, such that the second glass composition flows around the lower overflow distributor 220 and contacts the first glass composition 224 flowing over the outer forming surfaces 226 and 228 of the lower overflow distributor 220. The separate streams of the second glass composition 244 are fused to the respective separate streams of the first glass composition 224 flowing down respective outer forming surfaces 226 and 228 of the lower overflow distributor 220. Upon convergence of the streams of first glass composition 224 at draw line 230, the second glass composition 244 forms the first and second cladding layers 104 and 106 of the glass article 100.

In some embodiments, the first glass composition 224 of core layer 102 in the viscous state is contacted with the second glass composition 244 of the first and second cladding layers 104, 106 in the viscous state to form the laminated sheet. In some of such embodiments, the laminated sheet is part of a glass ribbon traveling away from the draw line 230 of the lower overflow distributor 220, as shown in FIG. 2. The glass ribbon can be drawn away from the lower overflow distributor 220 by, for example, gravity and/or pulling rollers. The glass ribbon cools as it travels away from the lower overflow distributor 220. The glass ribbon is severed to for the glass article 100 using a suitable technique, such as, for example, scoring, bending, thermally shocking, and/or laser cutting.

Although glass article 100 shown in FIG. 1 comprises three layers, other embodiments are intended to be included in this disclosure. In other embodiments, a glass article can have a determined number of layers, such as two, four, or more layers. For example, a glass article comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass article comprising four or more layers can be formed using additional overflow distributors and/or using overflow distributors with divided troughs. Thus, a glass article having a determined number of layers can be formed by modifying the overflow distributor accordingly.

In some embodiments, at least one of the core layer 102, first cladding layer 104, or the second cladding layer 106 comprises a tinted glass composition. For example, a first glass composition may comprise a tinting agent such that core layer 102 comprises a tinted layer. Additionally, or alternatively, a second glass composition may comprise a tinting agent such that first cladding layer 104 and/or second cladding layer 106 comprises a tinted layer.

In further embodiments, the first cladding layer and the second cladding layer may comprise different glass compositions as described herein. In some of such embodiments, one or both of a second glass composition or a third glass composition may comprise a tinting agent such that the corresponding first cladding layer and/or second cladding layer comprise a tinted layer. For example, the first cladding layer and the second cladding layer can comprise the same or a different tinting agent such that the first cladding layer and the second cladding layer have the same or a different tint or color.

In some embodiments, more than one layer of the glass article 100 comprises a tinted glass material. For example, the core layer 102 and at least one of the first cladding layer 104 or the second cladding layer 106 may comprise a tinted glass material. In some of such embodiments, the color of the core layer 102 and the color of the cladding layer 104 and/or the cladding layer 106 may be different from each other. Thus, the core layer 102 comprises a different tint or color than first cladding layer 104 and/or second cladding layer 106. In such embodiments, the glass article 100 comprises a tint or color that is a combination of the tint or color of core layer 102 and the different tint or color of first cladding layer 104 and/or second cladding layer 106. Thus, different tinted glass materials of different layers of the glass article 100 can be used to give the glass article 100 an overall desired tint or color.

In some embodiments, at least one layer of the glass article 100 includes a glass material that comprises copper as a tinting agent. However, in other embodiments, one or more other layers of the glass article 100 may include a glass material that comprises a different tinting agent, such as a transition metal selected from the group consisting of Ti, V, Cr, Mn, Fe, Co, Ni, Zn, Au, Ag, Pt, Ni, Mo, and, W, rare earth elements, and combinations thereof.

In some embodiments, the glass composition of one layer may be better suited to incorporate the tinting agent than the glass composition of another layer. Thus, in at least certain embodiments, the laminate structure of the glass article enables the tinting agent that will yield the desired color to be incorporated into the layer with the glass composition with which the tinting agent is most compatible.

In some embodiments, the glass article 100 comprises a thickness of at least about 0.05 mm, at least about 0.1 mm, at least about 0.2 mm, or at least about 0.3 mm. Additionally, or alternatively, glass article 100 comprises a thickness of at most about 5 mm, at most about 3 mm, at most about 2 mm, at most about 1.5 mm, at most about 1 mm, at most about 0.7 mm, or at most about 0.5 mm. By way of non-limiting example only, the glass article 100 may comprise a thickness of from about 0.2 mm to about 3 mm, from about 1 mm to about 3 mm, or from about 1.5 mm to about 2.5 mm. In some embodiments, a ratio of a thickness of the core layer 102 to a thickness of the glass article 100 is at least about 0.7, at least about 0.8, at least about 0.85, at least about 0.9, or at least about 0.95. In some embodiments, a thickness of the second layer (e.g., each of the first cladding layer 104 and the second cladding layer 106) is from about 0.01 mm to about 0.3 mm.

In some embodiments, the cladding layer is thinner than the core layer. For example, each of the first cladding layer and the second cladding layer is thinner than the core layer disposed therebetween as described herein. In some of such embodiments, the first cladding layer and/or the second cladding layer comprise a tinting agent such that the respective cladding layer comprises the tinted layer. Confining the tinting agent to the relatively thin cladding layers can reduce the amount of tinting agent used to achieve the desired tint or color in the glass article. Additionally, or alternatively, a smaller glass melting apparatus (e.g., melting tank) can be used to form the glass material with the tinting agent for the relatively thin cladding layers, compared to the melting apparatus used to form the glass material of the core layer. Thus, a relatively smaller batch of glass material comprising the tinting agent can be used, and the time required to switch to a different glass material (e.g., comprising a different tinting agent) can be reduced.

In some embodiments, the first glass composition and/or the second glass composition comprise a liquidus viscosity suitable for forming glass article 100 using a fusion draw process as described herein. For example, the first glass composition of the first layer (e.g., core layer 102) comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP.

Additionally, or alternatively, the second glass composition of the second layer (e.g., first and/or second cladding layers 104 and 106) comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the second layer. Thus, the second glass composition can comprise a liquidus viscosity that is lower than generally considered suitable for forming a single layer sheet using a fusion draw process.

In some embodiments, the liquidus viscosity of one layer/glass composition may be better suited to incorporate the tinting agent that the liquidus viscosity of another layer/glass composition. Thus, the laminate structure of the glass article enables the tinting agent that will yield the desired color to be incorporated into a layer having a liquidus viscosity with which the tinting agent is most compatible.

In some embodiments, glass article 100 may be configured as a strengthened glass article. For example, in some embodiments, the second glass composition of the first and/or second cladding layers 104, 106 comprises a different average coefficient of thermal expansion (CTE) than the first glass composition of the core layer 102. For example, the first and second cladding layers 104, 106 may be formed from a glass composition having a lower average CTE than the core layer 102. The CTE mismatch (i.e., the difference between the average CTE of first and/or second cladding layers 104 and 106 and the average CTE of core layer 102) results in formation of compressive stress in the cladding layers and tensile stress in the core layer upon cooling of glass article 100. Such strengthening can be achieved without subjecting the glass article 100 to a thermal strengthening (e.g., tempering) or chemical strengthening (e.g., ion exchange) process. Thus, strengthening the glass article 100 by CTE mismatch as described herein can enable the use of tinting agents that are incompatible with thermal strengthening and/or chemical strengthening processes, for example, copper doped glasses, which tend to be incompatible with chemical strengthening processes because such process can extract copper ions from the glass. In various embodiments, each of the first and/or second cladding layers, independently, can have a higher average CTE, a lower average CTE, or substantially the same average CTE as the core layer.

In some embodiments, the average CTE of the core layer 102 and the average CTE of the first and/or second cladding layers 104, 106 differ by at least about $5 \times 10^{-7} \, °C.^{-1}$, at least about $15 \times 10^{-7} \, °C.^{-1}$, at least about $25 \times 10^{-7} \, °C.^{-1}$, or at least about $30 \times 10^{-7} \, °C.^{-1}$. Additionally, or alternatively, the average CTE of the core layer 102 and the average CTE of the first and/or second cladding layers 104, 106 differ by at most about $100 \times 10^{-7} \, °C.^{-1}$, at most about $75 \times 10^{-7} \, °C.^{-1}$, at most about $50 \times 10^{-7} \, °C.^{-1}$, at most about $40 \times 10^{-7} \, °C.^{-1}$, at most about $30 \times 10^{-7} \, °C.^{-1}$, at most about $20 \times 10^{-7} \, °C.^{-1}$, or at most about $10 \times 10^{7} \, °C.^{-1}$. In some embodiments, the second glass composition of first and/or second cladding layers 104 and 106 comprises an average CTE of at most about $66 \times 10^{-7} \, °C.^{-1}$, at most about $55 \times 10^{-7} \, °C.^{-1}$, at most about $50 \times 10^{-7} \, °C.^{-1}$, at most about $40 \times 10^{-7} \, °C.^{-1}$, or at most about $35 \times 10^{7} \, °C.^{-1}$. Additionally, or alternatively, the second glass composition of first and/or second cladding layers 104 and 106 comprises an average CTE of at least about $25 \times 10^{-7} \, °C.^{-1}$, or at least about $30 \times 10^{7} \, °C.^{-1}$. Additionally, or alternatively, the first glass composition of core layer 102 comprises an average CTE of at least about $40 \times 10^{-7} \, °C.^{-1}$, at least about $50 \times 10^{-7} \, °C.^{-1}$, at least about $55 \times 10^{-7} \, °C.^{-1}$, at least about $65 \times 10^{-7} \, °C.^{-1}$, at least about $70 \times 10^{-7} \, °C.^{-1}$, at least about $80 \times 10^{-7} \, °C.^{-1}$, or at least about $90 \times 10^{7} \, °C.^{-1}$. Additionally, or alternatively, the first glass composition of core layer 102 comprises an average CTE of at most about $110 \times 10^{-7} \, °C.^{-1}$, at most about $100 \times 10^{-7} \, °C.^{-1}$, at most about $90 \times 10^{-7} \, °C.^{-1}$, at most about $75 \times 10^{-7} \, °C.^{-1}$, or at most about $70 \times 10^{7} \, °C.^{-1}$.

In some embodiments, one or more layers of the glass article 100 comprise an ion exchangeable glass composition. For example, the first cladding layer 104 and/or the second cladding layer 106 comprise an ion exchangeable glass composition such that the glass article can be further strengthened (e.g., to achieve a surface compressive stress greater than that achieved by CTE mismatch) after formation thereof. Exemplary ion exchangeable glass compositions suitable for use in the cladding layers include, but are not limited to, those described in U.S. Patent Application Pub. No. 2015/0030827, which is incorporated herein by reference in its entirety. For example, in some embodiments, the first cladding layer and/or the second cladding layer comprises an alkali metal.

The core layer 102 can comprise an alkali metal or can be substantially free (e.g., can comprise less than about 0.1 mol %) or free of alkali metal. Additionally, or alternatively, core layer 102 may comprise an ion exchangeable glass composition such that the glass article can be further strengthened (e.g., to achieve an increased compressive stress at the core/clad interface by ion exchange between adjacent layers of the glass article and/or to achieve a surface compressive stress at an exposed portion of the core layer along an edge of the glass article) after formation thereof. Exemplary ion exchangeable glass compositions suitable for use in the core layer include, but are not limited to, Corning® Gorilla® Glass compositions. The cladding layer can comprise an alkali metal or can be substantially free (e.g., comprise less than about 0.1 mol %) or free of alkali metal.

In some embodiments, the tint or color generated by the tinting agent can be affected by subjecting the glass article to an ion exchange process. For example, in embodiments in which the first cladding layer 104 and/or the second cladding layer 106 comprise the tinting agent, the glass article 100 can be subjected to an ion exchange process to generate the desired color (e.g., by changing the behavior of the tinting agent present in the cladding layer). Additionally, or alternatively, the core layer 102 comprises the tinting agent such that the glass article 100 can be subjected to the ion exchange process (e.g., to further strengthen the first cladding layer 104 and/or second the cladding layer 106) without substantially changing the tint or color generated by the tinting agent. Thus, the cladding layers protect the core layer during the ion exchange process so that the tinting agent is not substantially affected by the ion exchange process.

In various embodiments, the relative thicknesses of the glass layers can be selected to achieve a glass article having desired strength properties. For example, in some embodiments, the first glass composition of the core layer 102 and the second glass composition of the first and/or second cladding layers 104, 106 are selected to achieve a desired CTE mismatch, and the relative thicknesses of the glass layers are selected, in combination with the desired CTE mismatch, to achieve a desired compressive stress in the cladding layers and tensile stress in the core layer. Without wishing to be bound by any theory, it is believed that the strength of the glass article can be determined predominantly by the relative thicknesses of the glass layers and the compressive stress in the cladding layers, and that the breakage pattern of the glass article can be determined predominantly by the relative thicknesses of the glass layers and the tensile stress in the core layer. Thus, the glass compositions and relative thicknesses of the glass layers can be selected to achieve a glass article having a desired strength and/or breakage pattern.

The glass article can have the desired strength and/or breakage pattern in an as-formed condition without additional processing (e.g., thermal tempering or ion-exchange treatment). For example, the as-formed glass sheet or shaped glass article can have an improved strength as compared to thermally tempered or ion-exchanged glass articles as described herein.

In some embodiments, the compressive stress of the cladding layers is at most about 800 MPa, at most about 500 MPa, at most about 350 MPa, or at most about 150 MPa.

Additionally, or alternatively, the compressive stress of the cladding layers is at least about 10 MPa, at least about 20 MPa, at least about 30 MPa, at least about 50 MPa, or at least about 250 MPa. Additionally, or alternatively, the tensile stress of the core layer is at most about 150 MPa, or at most about 100 MPa. Additionally, or alternatively, the tensile stress of the core layer is at least about 5 MPa, at least about 10 MPa, at least about 25 MPa, or at least about 50 MPa.

In some embodiments, glass article 100 is configured as a durable glass article. For example, glass article 100 is resistant to degradation in response to exposure to a reagent. In some embodiments, the second glass composition of the first and/or second cladding layers 104, 106 comprises a durable glass composition that is resistant to degradation in response to exposure to the reagent. In some embodiments, the glass article comprises a core covered with a cladding. For example, the core layer 102 is enveloped within a cladding comprising the first cladding layer 104 and second cladding layer 106 as shown in FIG. 1.

In some of such embodiments, the first glass composition of core layer 102 comprises a non-durable glass composition that is non-resistant to degradation in response to exposure to the reagent. The durable cladding can aid in protecting the core from exposure to the reagent. In other embodiments, the first glass composition comprises a durable glass composition that is resistant to degradation in response to exposure to the reagent. Thus, because the core is enveloped within the cladding, the first glass composition of the core of the durable glass article can comprise a durable or non-durable glass composition. In some embodiments, the core layer comprises the tinted layer, which can be non-durable, and the cladding layer serves to protect the tinted layer. Additionally, or alternatively, the core layer comprises a tinting agent that is reactive with air (e.g., Cu), and the cladding layer serves to prevent contacting the tinting agent with air at the surface of the glass article.

In various embodiments, a glass article can be used in applications in which strength and/or chemical durability are beneficial. For example, chemical durability can be beneficial for applications in which the glass will be used outdoors (e.g., automotive glass or architectural glass) or for other applications in which the glass article is likely to come into contact with potentially corrosive reagents such as acids or bases (e.g., laboratory benchtops). Strength can be beneficial in these same applications to avoid breakage of the glass article.

The first glass composition of core layer 102 and the second glass composition of first and/or second cladding layers 104 and 106 can comprise suitable glass compositions capable of forming a glass article with desired properties as described herein. Exemplary glass compositions and selected properties of the exemplary glass compositions can include those described in International Patent Application No. PCT/US2015/029671, which is incorporated by reference herein in its entirety.

In some exemplary embodiments, provided are laminate glass articles that may be tinted and/or textured. As used herein a "textured" laminate glass article comprises a surface roughness of at least about 400 Ra (u-inch), such as at least about 410 Ra (u-inch), at least about 420 Ra (u-inch), at least about 430 Ra (u-inch), at least about 440 Ra (u-inch), at least about 450 Ra (u-inch), at least about 460 Ra (u-inch), at least about 470 Ra (u-inch), at least about 480 Ra (u-inch), at least about 490 Ra (u-inch), or at least about 500 Ra (u-inch). Conversely, a "smooth surface" comprises a surface roughness of less than about 125 Ra (u-inch), such as less than about 120 Ra (u-inch), less than about 115 Ra (u-inch), or less than about 110 Ra (u-inch). For example, one or both cladding layers of the laminate glass article may be partially or completely textured using one or more textured rollers. In various embodiments, a textured laminate glass article may be formed by a method including: drawing a glass laminate (e.g., from an overflow distributor, a slot draw apparatus, a float bath, or another glass forming apparatus) including a glass core layer and at least one glass cladding layer thermally fused to the core layer; texturing the glass laminate by rolling a textured roller along a first surface of the glass laminate (e.g., an outer surface of the cladding layer) while a portion of the glass laminate contacting the textured roller has a temperature between the softening points of the cladding layer and the core layer (e.g., as the glass laminate is drawn); and cutting the textured glass laminate to form a textured laminate glass article. One or more of the core and cladding layers of the glass laminate may include a tinted glass composition, such as an alkali-free aluminosilicate glass composition described below. For example, a textured glass laminate may include: a tinted core layer and colorless cladding layers; a tinted core layer, a colorless first cladding layer, and a tinted second cladding layer; a tinted core layer, a tinted first cladding layer, and a tinted second cladding layer; a colorless core layer, a tinted first cladding layer, and a colorless second cladding layer; or a colorless core layer and tinted first and second cladding layers. Accordingly, a textured glass laminate may include any of the above tinted and/or colorless layers to create different composite tints. In some embodiments the core layer may have a higher softening point than the cladding layer, but the present disclosure is not limited thereto. Such a difference in softening point may enable the relatively more viscous or harder core layer to maintain the shape and/or stability of the laminate glass article during texturing of the relatively less viscous or softer cladding layer(s).

Alkali-Free Aluminosilicate Glass Composition

In various embodiments, provided are alkali-free aluminosilicate glass compositions that include copper as a tinting agent. In some embodiments, the glass compositions may be tinted in various colors. For example, the glass composition may be tinted blue, green, bluish green, or red. In other embodiments, the glass composition may include copper but may appear colorless or substantially colorless. The coloration of the glass composition may be achieved during glass formation, in at least some embodiments. In other embodiments, the glass composition may be achieved by reheating an annealed glass (e.g., by striking in).

The glass composition may be used as a core layer, a cladding layer, or any combination thereof of a glass laminate, such as the glass article 100 described above. For example, in some embodiments, the glass composition may be used to form a tinted core layer, a tinted cladding layer or layers, or a combination thereof, of the glass laminate. In other embodiments, the glass composition may be used to form a glass sheet that is not part of a laminate (e.g., a single-layer glass sheet). The glass composition may have anti-microbial properties, in some embodiments. The glass composition may be included in a glass article configured as a waveguide, in some embodiments. The glass composition may be formed using a fusion draw process, as described above.

In various embodiments, the glass composition may include a glass network former, one or more alkaline earth oxides, one or more redox agents, and copper. Exemplary compositional ranges are shown in Table 1 below.

TABLE 1

Exemplary Glass Compositions

| (Mol %) | Min | Max |
| --- | --- | --- |
| Glass Network Former | 75 | 94 |
| Alkaline Earth Oxide | 7 | 25 |
| Cu/CuO | 0.5 | 20 |
| Redox Agent | 0 | 7 |

As shown in Table 1, exemplary glass compositions may comprise from about 75 to about 94 mol % of a glass network former, such as from about 77 to about 93 mol %, from about 78 to about 92 mol %, or from about 80 to about 90 mol % of a glass network former. The glass network former may be a metal silicate. For example, the glass network former may include $SiO_2$ and $Al_2O_3$, or $SiO_2$, $Al_2O_3$, and $B_2O_3$, or $SiO_2$, $Al_2O_3$, and/or $B_2O_3$, and/or $P_2O_5$.

Exemplary glass compositions may include from about 7 to about 25 mol % of one or more alkaline earth oxides. For example, the glass composition may include from about 7.89 to about 24.5 mol %, from about 9 to about 24 mol %, or from about 10 to about 23 mol % of at least one alkaline earth oxide. In some embodiments, the alkaline earth oxide may be selected from the group consisting of MgO, CaO, SrO, BaO, and combinations thereof, for example.

Exemplary glass compositions may include from about 0.5 to about 20 mol % CuO. For example, the glass composition may include from about 0.5 to about 15 mol %, from about 0.5 to about 9 mol %, from about 0.5 to about 8 mol %, from about 0.5 to about 7, or from about 1 to about 4.5 mol % CuO. While component amounts are described with respect to CuO, copper may be included in an exemplary glass composition in any oxidation state.

Exemplary glass compositions may include from about 0 to about 7 mol % of a redox agent. For example, the glass composition may include from about 0 to about 6 mol %, from about 0.5 to about 6 mol %, from about 1 to about 5 mol %, or from about 1.5 to about 4.5 mol % of at least one redox agent. In some embodiments, the glass composition may also include a redox agent selected from SnO, $SnO_2$, $Sb_2O_3$, $As_2O_3$, $Ce_2O_3$, Cl (e.g., derived from KCl or NaCl), $ZrO_2$, C, or $Fe_2O_3$. For example, the glass composition may comprise one or more additional components selected from $SnO_2$, charcoal, or a combination thereof. In some embodiments, the glass composition may include SnO and may be free of other redox agents such as Sb, As, S, C, or Ce.

The copper may be present in the glass composition as a colloidal metal and may operate as a tinting agent according to the oxidation state thereof. For example, in embodiments in which the redox agent comprises Sn, one or both of the following reactions can take place within the tinted layer to control the color thereof:

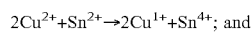

$2Cu^{2+} + Sn^{2+} \rightarrow 2Cu^{1+} + Sn^{4+}$; and

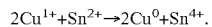

$2Cu^{1+} + Sn^{2+} \rightarrow 2Cu^{0} + Sn^{4+}$.

While not wishing to be bound to a particular theory, it is believe that the color of the glass composition varies according to the oxidation state of the copper, which may be affected by other components of the glass composition acting as previously unrecognized reductants. This may be due at least in part to structural changes in the glass network. For example, the color of the glass composition may correspond to a ratio between the total amounts of $Al_2O_3$ and $B_2O_3$, a total amount of alkaline earth metals RO, and an average ionic radius of the alkaline earth metals. For example, a mol % ratio of $RO/Al_2O_3$ or $RO/(Al_2O_3+B_2O_3)$ may be used in conjunction with the average ionic radius of the alkaline earth metals, in order to predict the color of different glass compositions. In general the presence of $RO/Al_2O_3 > 1$ and high average ionic radius may be associated with red coloration. All of these conditions in combination may lead to the reduction of copper cations to metallic copper.

According to various embodiments, a mol % ratio of $RO/Al_2O_3$ may range from about 0.5 to about 5, such as from about 1 to about 4. In some embodiments, a mol % ratio of $RO/(Al_2O_3+B_2O_3)$ may range from about 0.1 to about 4.5, such as from about 0.2 to about 4.

In various embodiments, the glass composition may include trace amounts of other components, such as $ZrO_2$ or other inorganic components.

In some embodiments, the glass composition may have a blue tint. For example, the glass composition may have a blue color having $L^*a^*b^*$ coordinates of $L^* < 96$, $a^* < -1$, and $b^* < 1$.

In some embodiments, the glass composition may have a red tint. For example, the glass composition may have a red color having $L^*a^*b^*$ coordinates of $L^* < 96$, $a^* > 0$, and $0 < b^*/a^* < 1.5$.

In some embodiments, the glass composition may have a green tint. For example, the glass composition may have a green color having $L^*a^*b^*$ coordinates of $L^* < 96$, $a^* < 0$, and $b^* > 0$.

According to various embodiments, the glass composition may include compositional ranges and corresponding exemplary batch materials as shown in Table 2 below.

TABLE 2

Exemplary Glass Compositions

| (Mol %) | Min | Max |
| --- | --- | --- |
| $SiO_2$ | 45 | 80 |
| $Al_2O_3$ | 6 | 22 |
| $B_2O_3$ | 0 | 25 |
| MgO | 0 | 9 |
| CaO | 0 | 22 |
| SrO | 0 | 22 |
| BaO | 0 | 22 |
| $SnO_2$ | 0 | 6 |
| CuO | 0.5 | 20 |
| C | 0 | 0.5 |

Referring to Table 2, exemplary glass compositions may comprise a glass network former selected from $SiO_2$, $Al_2O_3$, $B_2O_3$, and combinations thereof. For example, the glass composition may include $SiO_2$ and $Al_2O_3$ as glass network formers. In other embodiments, the glass composition may include $SiO_2$, $Al_2O_3$, and $B_2O_3$ as glass network formers.

In some embodiments, exemplary glass compositions may comprise from about 40 to about 80 mol % $SiO_2$. In other embodiments the glass composition may include from about 45 to about 75 mol % $SiO_2$, from about 50 to about 72 mol % $SiO_2$, from about 60 to about 70 mol % $SiO_2$, or from about 60 to about at least about 71 mol % $SiO_2$.

Additionally, or alternatively, exemplary glass compositions may comprise from about 5 to about 22 mol % $Al_2O_3$. For example, the glass composition may include from about 6 to about at least about 21 mol % $Al_2O_3$, from about 7 to about 20 mol % $Al_2O_3$, from about 8 to about 18 mol % $Al_2O_3$, or from about 9 to about 15 mol % $Al_2O_3$.

In some embodiments, exemplary glass compositions may include 0 to 25 mol % $B_2O_3$. For example, the glass composition may include 0 to about 24 mol % $B_2O_3$, from about 1 to about 22 mol % $B_2O_3$, from about 5 to about 18 mol % $B_2O_3$, from about 6 to about 15 mol % $B_2O_3$, or from about 7 to about 12 mol % $B_2O_3$. In some embodiments, the glass composition may be free or substantially free of $B_2O_3$.

According to various embodiments, exemplary glass compositions may include an alkaline earth metal oxide, such as MgO, CaO, SrO, BaO, and combinations thereof. The alkaline earth metal oxides may be derived from nitrate, carbonate and/or pure oxide batch materials.

In various embodiments, exemplary glass compositions may include from 0 to about 9 mol % MgO. For example, the glass composition may include from 0 to 8 mol % MgO, from about 1 to about 7 mol % MgO, from about 2 to about 7 mol % MgO, or from about 3 to about 5 mol % MgO.

Additionally, or alternatively, exemplary glass compositions may include MgO, CaO, BaO, and/or SrO in amounts independently ranging from 0 to 22 mol %. For example, the glass composition may include MgO, CaO, BaO and/or SrO in amounts independently ranging from 0 to about 21 mol %, from about 1 to about 20 mol %, from about 2 to about 15 mol %, from about 3 to about 12 mol %, or from about 5 to about 10 mol %.

In various embodiments, exemplary glass compositions may include tin ($SnO_2$) and/or carbon (e.g., charcoal) as a redox agent. For example, the glass composition may include 0 to about 7 mol % tin, which may be added as a super addition. In other embodiments, the glass composition may include 0 to 6 mol %, from about 0.05 to about 5 mol %, from about 0.1 to about 5 mol %, from about 0.25 to about 4 mol %, or from about 0.5 to about 3 mol % tin. The tin may operate as a fining agent. In some embodiments, the glass composition may be free or substantially free of tin. The glass composition may optionally include from about 0 to about 1 mol %, such as from about 0 to about 0.5 mol % carbon (e.g., in the form of charcoal, sugar, starch, or other organic materials).

Exemplary glass compositions may include up to 20 mol % copper (CuO). The copper may or may not be included as a super addition. In various embodiments, the glass composition may include a relatively small amount of copper and still exhibit a desired color, as compared to conventional glass compositions that require a substantial amount of copper when used as a tinting agent. For example, in some embodiments the glass composition may include from about 0.1 to about 15 mol %, from about 0.25 to about 8 mol %, from about 0.5 to about 4.5 mol %, from about 0.75 to about 3 mol %, or from about 1 to about 2 mol % copper.

In some embodiments, glass compositions may have a ruby red color, when the glass composition includes $Al_2O_3$<10 mol %, $B_2O_3$<0.1 mol %, BaO>2 mol %, $SnO_2$<1 mol %, and CuO>0.5 mol %. Exemplary glass compositions may have a green color, when the glass composition includes $Al_2O_3$>10 mol %, $B_2O_3$>0 mol %, BaO<10 mol %, $SnO_2$≤0.1 mol %, CuO≥0.5 mol %.

Exemplary glass compositions may have a blue color, when the glass composition includes BaO<10 mol %. Exemplary glass may have a blue color when oxidizing agents, such as nitrates, are included and/or reducing agents, such as carbon, are excluded from the glass batch materials.

In any of these embodiments, the glass composition may include other components in addition to those explicitly listed in amounts described herein.

According to various embodiments, the glass composition may be included in at least one layer of a glass article with the general configuration shown in FIG. 1. In particular, the glass composition may be used to form at least one tinted layer of the glass article, to thereby provide a tinted glass article. In some embodiments, the tinted layer may be the core layer. In this case, copper included in the glass composition may be protected from reacting with air and/or water. Additionally, or alternatively, the tinted core layer may give the glass article a 3D appearance or provide a depth of color not present in single layer tinted glass articles. In such embodiments, the cladding layers can be substantially colorless or tinted to enable a glass article with a desired color achieved by combining different colored cladding and core layers as described herein.

In some embodiments, the glass article described herein can be used as a first pane or ply in a glass-polymer laminate. For example, the glass-polymer laminate comprises the first pane and a second pane laminated to each other with a polymeric interlayer disposed therebetween. In some embodiments, the second pane comprises a second glass article as described herein. The second glass article can have the same or a different configuration than the glass article of the first pane. In other embodiments, the second pane comprises a single-layer glass sheet (e.g., an annealed glass sheet, a thermally strengthened glass sheet, or a chemically strengthened glass sheet) or a polymeric sheet (e.g., a polycarbonate sheet). The interlayer comprises poly vinyl butyral (PVB) or another suitable polymeric material.

In various embodiments, the glass articles described herein can be incorporated into vehicles such as automobiles, boats, and airplanes (e.g., glazing such as windshields, windows or sidelites, mirrors, pillars, side panels of a door, headrests, dashboards, consoles, or seats of the vehicle, or any portions thereof), architectural fixtures or structures (e.g., internal or external walls of building, and flooring), appliances (e.g., a refrigerator, an oven, a stove, a washer, a dryer, or another appliance), consumer electronics (e.g., televisions, laptops, computer monitors, and handheld electronics such as mobile phones, smart phones, tablets, and music players), furniture, information kiosks, retail kiosks, and the like. For example, the glass articles described herein can be used in display (e.g., cover glass, color filter, or glass backplane) and/or touch panel applications, whereby the glass article can enable a display and/or touch panel with desired attributes of the glass article such as curved shape, mechanical strength, etc. In some embodiments, such displays can comprise a micro-LED, an OLED, an LCD, a plasma cell, an electroluminescent (EL) cell array, or another suitable element configured to emit radiation. In other embodiments, such displays can comprise projection displays. For example, the glass article comprises light scattering features for displaying an image projected thereon. In another example, the glass articles described herein can be used in consumer electronics applications. For example, the glass articles can be used as part of a case for a mobile phone or smart phone (e.g., a back side of the device opposite the display).

In some embodiments, a display comprising a glass article described herein is at least partially transparent to visible light. Ambient light (e.g., sunlight) can make the display image difficult or impossible to see when projected on or generated by such a display. In some embodiments, the display, or portion thereof on which the display image is projected or from which the display image is emitted, can include a darkening material such as, for example, an inorganic or organic photochromic or electrochromic material, a suspended particle device, and/or a polymer dispersed liquid crystal. Thus, the transparency of the display can be adjusted to increase the contrast of the display image. For example, the transparency of the display can be reduced in bright sunlight by darkening the display to increase the contrast of the display image. The adjustment can be controlled automatically (e.g., in response to exposure of the display surface to a particular wavelength of light, such as ultraviolet light, or in response to a signal generated by a light detector, such as a photoeye) or manually (e.g., by a viewer).

The glass articles described herein can be used for a variety of applications including, for example, for cover glass, color filters, or glass backplane applications in consumer or commercial electronic devices including, for example, LCD, LED, microLED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications including, for example, glazing and displays; for commercial or household appliance applications; for lighting or signage (e.g., static or dynamic signage) applications; or for transportation applications including, for example, rail and aerospace applications.

EXAMPLES

Various embodiments will be further clarified by the following glass material examples. Glass sheets were formed by blending batch materials for one hour in a turbula mixer with media. The resultant mixture was melted in Pt crucibles at 1650° C., for 6 hours, in an electric furnace with an ambient air atmosphere. The resulting glass was annealed at temperatures ranging from about 725° C. to 770° C. Samples for transmission and color measurements were prepared by core drilling a 33 mm diameter piece from the annealed glass, and polishing the piece to a thickness of 0.7-0.8 mm. Color measurements were performed using an X-Rite Color i7 Benchtop Spectrophotometer, a reflectance/transmittance reference-level, dual beam sphere spectrophotometer that calculates percent transmission from 360 nm to 750 nm wavelengths and provides L*a*b* color coordinates for each measured sample. Color coordinates were calculated for D65 illuminant and 10 degree observer. Absorption (ABS) was calculated from the transmission data using the formula ABS=−log(T/100), where T is transmission in percent.

Example 1

Red tinted glass compositions were formed from batch materials shown in Table 3 below. The amounts of the various components are given in Table 3 as mol % on an oxide basis. Table 3 also includes L*a*b* color coordinates for selected glass compositions having thicknesses of 0.7 mm+/−0.1 mm. In addition, Table 3 provides total molar amounts of included alkaline earth metal oxides (RO) and ratios of the total RO amounts to molar amounts of $Al_2O_3$ and ($Al_2O_3+B_2O_3$).

TABLE 3

Exemplary Red Glass Compositions

| (Mol %) | R1 | R2 | R3 | R4 | R5 | R6 | R7 | R8 | R9 | R10 | R11 |
| --- | --- | --- | --- | --- | --- | --- | --- | --- | --- | --- | --- |
| $SiO_2$ | 48.7 | 62.3 | 71.2 | 66.3 | 69.3 | 67.3 | 68.3 | 68.3 | 68.3 | 69.3 | 68.3 |
| $Al_2O_3$ | 9.6 | 16 | 7.75 | 9.63 | 6.63 | 9.6 | 9.6 | 9.6 | 6.1 | 9.63 | 9.6 |
| $B_2O_3$ | 18.6 | 5 | 1 | 3 | 3 | | | | | | |
| CaO (carbonate) | | | | 14.88 | 14.88 | | 6 | 15 | 17.5 | 14.88 | 18 |
| SrO (carbonate) | | | 10 | | | | | | | | |
| BaO (carbonate) | 22 | 16 | 10 | 6.08 | 6.08 | 22 | 15 | 6 | 7 | 6.08 | 3 |
| CuO | 1 | 1 | 1 | 1 | 1 | 1 | 1 | 1 | 1 | 1 | 1 |
| $SnO_2$ | | | 0.1 | 0.09 | 0.09 | 0.1 | 0.1 | 0.1 | 0.1 | 0.09 | 0.1 |
| Color | red | red | red | red | red | red | red | red | red | red | red |
| L* | 24.12 | 93.29 | 2.16 | 57.34 | 28.42 | 3.07 | 6.59 | 23.04 | 1.73 | 41.61 | 95.55 |
| a* | 52.86 | 1.13 | 3.62 | 40.39 | 58.37 | 19.42 | 33.21 | 53.77 | 10.6 | 59.63 | 0.24 |
| b* | 39.14 | 0.51 | 0.72 | 34.65 | 48.1 | 5.05 | 11.05 | 39.16 | 2.72 | 55.23 | 1.28 |
| Total RO | 22 | 16 | 20 | 20.96 | 20.96 | 22 | 21 | 21 | 24.5 | 20.96 | 21 |
| RO/$Al_2O_3$ | 2.29 | 1.00 | 2.58 | 2.18 | 3.16 | 2.29 | 2.19 | 2.19 | 4.02 | 2.18 | 2.19 |
| RO/($B_2O_3$ + $Al_2O_3$) | 0.78 | 0.76 | 2.29 | 1.66 | 2.18 | 2.29 | 2.19 | 2.19 | 4.02 | 2.18 | 2.19 |

| (Mol %) | R12 | R13 | R14 | R15 | R16 | R17 | R18 | R19 | R20 |
| --- | --- | --- | --- | --- | --- | --- | --- | --- | --- |
| $SiO_2$ | 68 | 68 | 68 | 68 | 68 | 68 | 68 | 68 | 68 |
| $Al_2O_3$ | 11 | 11 | 11 | 11 | 11 | 11 | 11 | 11 | 11 |
| $B_2O_3$ | 10 | 10 | 10 | 10 | 10 | 10 | 10 | 10 | 10 |
| CaO | 11 | 11 | 11 | 11 | 11 | 11 | 11 | 11 | 11 |
| CuO | 1.75 | 6 | 6 | 7 | 7 | 7 | 8 | 5 | 5 |
| SnO2 | 5.25 | 1 | 2 | 0 | 1 | 2 | 2 | 1 | 2 |
| Color | red | red | red | red | red | red | red | red | red |
| Total RO | 11 | 11 | 11 | 11 | 11 | 11 | 11 | 11 | 11 |
| RO/$Al_2O_3$ | 1 | 1 | 1 | 1 | 1 | 1 | 1 | 1 | 1 |
| RO/($B_2O_3$ + $Al_2O_3$) | 0.52 | 0.52 | 0.52 | 0.52 | 0.52 | 0.52 | 0.52 | 0.52 | 0.52 |

| (Mol %) | R21 | R22 | R23 | R24 | R25 | R26 |
| --- | --- | --- | --- | --- | --- | --- |
| $SiO_2$ | 68 | 68 | 58.55 | 58.55 | 58.55 | 58.55 |
| $Al_2O_3$ | 11 | 11 | 8.53 | 8.53 | 8.53 | 8.53 |
| $B_2O_3$ | 10 | 10 | 25 | 25 | 25 | 25 |

TABLE 3-continued

Exemplary Red Glass Compositions

| | | | | | | |
|---|---|---|---|---|---|---|
| CaO | 11 | 11 | 7.89 | 7.89 | 7.89 | 7.89 |
| CuO | 4 | 4 | 5 | 10 | 15 | 20 |
| SnO2 | 1.5 | 2 | 0.1 | 0.1 | 0.1 | 0.1 |
| Color | red/phase sep | red/phase sep | red | red | red | red |
| Total RO | 11 | 11 | 7.89 | 7.89 | 7.89 | 7.89 |
| RO/Al$_2$O$_3$ | 1 | 1 | 0.92 | 0.92 | 0.92 | 0.92 |
| RO/(B$_2$O$_3$ + Al$_2$O$_3$) | 0.52 | 0.52 | 0.24 | 0.24 | 0.24 | 0.24 |

Figure 3:
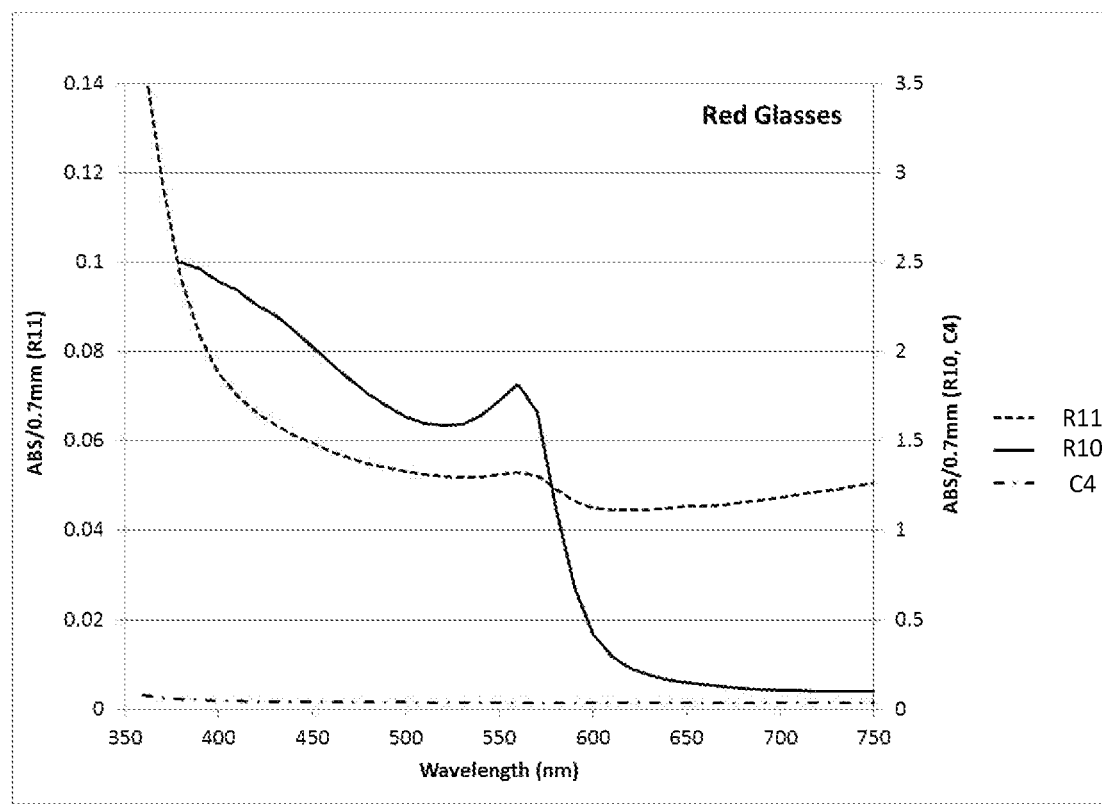
FIGS. 3-5 are graphs showing the transmittance spectra of different exemplary glass compositions, according to various embodiments of the present disclosure.

FIG. 3 is a graph illustrating the absorbance spectra of red-tinted glass compositions R10 and R11. As can be seen in FIG. 3, the red-tinted glass compositions R10 and R11 had a local absorbance maximum at 550-570 nm, and an absorbance that was less in the 600-700 nm wavelength range than in the 350-550 nm wavelength range.

Example 2

Blue tinted glass compositions shown in Table 4 were formed as noted above. The amounts of the various components are given in Table 4 as mol % on an oxide basis. Table 4 also includes L*a*b* color coordinates for selected glass compositions having thicknesses of 0.7 mm+/−0.1 mm. In addition, Table 4 provides total molar amounts of included alkaline earth metal oxides (RO) and ratios of the total RO amounts to molar amounts of Al$_2$O$_3$ and (Al$_2$O$_3$+ B$_2$O$_3$).

TABLE 4

Exemplary Blue Tinted Glass Compositions

| (Mol %) | B1 | B2 | B3 | B4 | B5 | B6 | B7 | B8 |
|---|---|---|---|---|---|---|---|---|
| SiO$_2$ | 68 | 48.7 | 67.3 | 69.3 | 66.95 | 67.3 | 68.95 | 71.15 |
| Al$_2$O$_3$ | 10 | 9.6 | 9.6 | 9.63 | 10.49 | 9.6 | 10.49 | 7.75 |
| B$_2$O$_3$ | | 18.6 | | | | | | 0.99 |
| CaO (nitrate) | | | | | | | | |
| CaO (carbonate) | | 22 | | 14.88 | 14.04 | | 13.04 | |
| SrO (nitrate) | | | 0.5 | | | | | 0.5 |
| SrO (carbonate) | | | 22 | | | 22 | | 9.98 |
| BaO (nitrate) | 0.5 | | | 6.08 | | | | |
| BaO (carbonate) | 21.5 | | | | 7.94 | | 6.94 | 9.98 |
| SnO$_2$ | 0.1 | | 0.1 | 0.09 | 0.08 | 0.1 | 0.08 | 0.1 |
| CuO | 1 | 1 | 1 | 1 | 1 | 1 | 1 | 1 |
| Color | blue | blue | blue | blue | blue | blue | blue | blue |
| L* | 91.39 | 90.51 | 91.03 | 92.99 | 90.61 | 91.14 | 91.68 | 90.57 |
| a* | −5.45 | −7.31 | −5.92 | −4.08 | −5.93 | −6.01 | −4.58 | −7.18 |
| b* | −1.34 | −0.29 | −1.1 | 0.75 | 0.45 | −1.59 | 0.86 | −1.95 |
| Total RO | 22 | 22 | 22.5 | 20.96 | 21.98 | 22 | 19.98 | 20.01 |
| RO/Al$_2$O$_3$ | 2.2 | 2.29 | 2.34 | 2.18 | 2.1 | 2.29 | 1.9 | 2.58 |
| RO/(B$_2$O$_3$ + Al$_2$O$_3$) | 2.2 | 0.78 | 2.34 | 2.18 | 2.1 | 2.29 | 1.9 | 2.29 |

Figure 4:
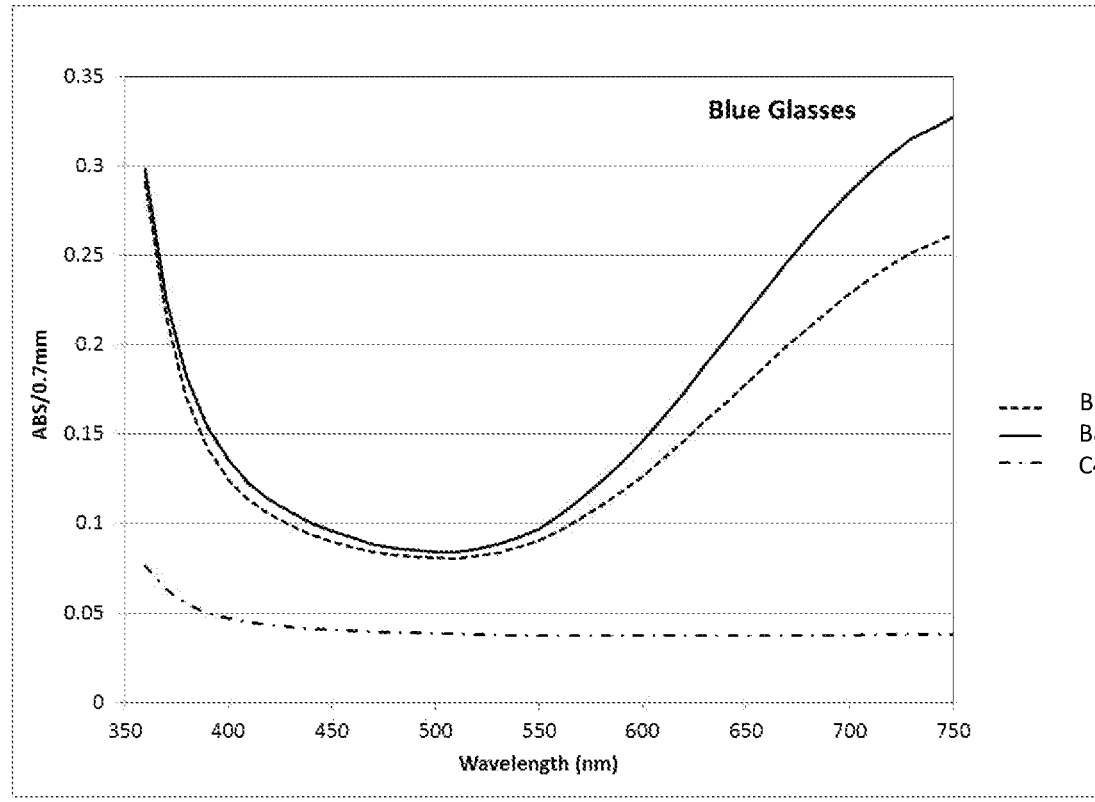

FIG. 4 is a graph illustrating the absorbance spectrum of blue-tinted glass compositions B1 and B8. As can be seen in FIG. 4, the blue-tinted glass compositions B1 and B8 had an absorbance minimum between about 450 nm and about 550 nm, which provides a greenish blue or blue coloration.

Example 3

Green tinted glass compositions shown in Table 5 were formed as noted above. The amounts of the various components are given in Table 5 as mol % on an oxide basis. Table 5 also includes L*a*b* color coordinates for selected glass compositions having thicknesses of 0.7 mm+/−0.1 mm. In addition, Table 5 provides total molar amounts of included alkaline earth metal oxides (RO) and ratios of the total RO amounts to molar amounts of Al$_2$O$_3$ and (Al$_2$O$_3$+ B$_2$O$_3$).

TABLE 5

Exemplary Green Tinted Glass Compositions

| (Mol %) | G1 | G2 | G3 | G4 | G5 | G6 | G7 | G8 | G9 |
|---|---|---|---|---|---|---|---|---|---|
| SiO$_2$ | 68 | 67.3 | 64.8 | 62.3 | 68.3 | 67.3 | 68.3 | 69.95 | 67.3 |
| Al$_2$O$_3$ | 10 | 16 | 16 | 16 | 15.3 | 9.6 | 9.6 | 9.49 | 22 |
| B$_2$O$_3$ | | | 2.5 | 5 | | | | | |
| CaO (nitrate) | 0.5 | | | | 0.5 | | 0.5 | | |
| CaO (carbonate) | 21.5 | 16 | 16 | 16 | 10.9 | 22 | 15 | 13.04 | |
| BaO (nitrate) | | | | | | | | | |
| BaO (carbonate) | | | | | 6 | | 6 | 6.94 | 10 |
| SnO$_2$ | 0.1 | | | | 0.1 | 0.1 | 0.1 | 0.08 | 0.1 |
| CuO | 1 | 1 | 1 | 1 | 1 | 1 | 1 | 1 | 1 |
| Color | green | green | green | green | green | green | green | green | green |
| L* | 90.8 | 91.76 | 92.03 | 91.53 | 92.14 | 93.58 | 91.32 | 90.84 | 91.01 |
| a* | −5.14 | −3.08 | −3.32 | −4.09 | −2.77 | −2.44 | −4.95 | −5.41 | −0.94 |
| b* | 2.49 | 4.57 | 3.84 | 3.71 | 3.67 | 2.63 | 1.32 | 1.01 | 0.78 |
| Total RO | 22 | 16 | 16 | 16 | 17.4 | 22 | 21.5 | 19.98 | 10 |

TABLE 5-continued

Exemplary Green Tinted Glass Compositions

| | | | | | | | | | |
|---|---|---|---|---|---|---|---|---|---|
| RO/Al$_2$O$_3$ | 2.2 | 1 | 1 | 1 | 1.14 | 2.29 | 2.24 | 2.11 | 0.45 |
| RO/(B$_2$O$_3$ + Al$_2$O$_3$) | 2.20 | 1.00 | 0.86 | 0.76 | 1.14 | 2.29 | 2.24 | 2.11 | 0.45 |

| (Mol %) | G10 | G11 | G12 | G13 | G14 | G15 | G16 | G17 | G18 |
|---|---|---|---|---|---|---|---|---|---|
| SiO$_2$ | 68.95 | 68.95 | 68.95 | 68.95 | 68.95 | 68.95 | 68.95 | 68.95 | 69.17 |
| Al$_2$O$_3$ | 10.49 | 10.49 | 10.49 | 10.49 | 10.49 | 10.49 | 10.49 | 10.49 | 10.51 |
| B$_2$O$_3$ | 9.89 | 9.89 | 9.89 | 9.89 | 4.89 | 9.89 | 9.89 | 9.89 | 9.53 |
| MgO (pure) | 2 | | | 8.09 | | | | | 2.01 |
| CaO (carbonate) | 8.09 | | 8.09 | | 10.59 | 10.09 | | | 8.13 |
| SrO (carbonate) | | 2 | | | | | 10.09 | | 0.56 |
| BaO (carbonate) | | | 2 | 2 | 4.5 | | 0 | 10.09 | |
| SnO$_2$ | 0.08 | 0.08 | 0.08 | 0.08 | 0.08 | 0.08 | 0.08 | 0.08 | 0.08 |
| CuO | 1 | 1 | 1 | 1 | 1 | 1 | 1 | 1 | 1 |
| Color | green | green | green | green | green | green | green | green | green |
| L* | 94.67 | 94.84 | 95.1 | 95.51 | 93.06 | 94.44 | 94.24 | 94.26 | 94.3 |
| a* | −1.96 | −1.59 | −1.42 | −1.51 | −3.38 | −1.93 | −1.76 | −1.62 | −2.16 |
| b* | 1.8 | 2.04 | 1.88 | 0.67 | 1.49 | 2.35 | 1.98 | 2.24 | 2.38 |
| Total RO | 10.09 | 10.09 | 10.09 | 10.09 | 15.09 | 10.09 | 10.09 | 10.09 | 10.7 |
| RO/Al$_2$O$_3$ | 0.96 | 0.96 | 0.96 | 0.96 | 1.44 | 0.96 | 0.96 | 0.96 | 1.02 |
| RO/(B$_2$O$_3$ + Al$_2$O$_3$) | 0.5 | 0.5 | 0.5 | 0.5 | 0.98 | 0.5 | 0.5 | 0.5 | 0.53 |

| (Mol %) | G19 | G20 | G21 | G22 | G23 | G24 | G25 | G26 | G27 | G28 | G29 | G30 |
|---|---|---|---|---|---|---|---|---|---|---|---|---|
| SiO$_2$ | 68 | 68 | 68 | 68 | 68 | 68 | 68 | 68 | 68 | 68 | 68 | 68 |
| Al$_2$O$_3$ | 11 | 11 | 11 | 11 | 11 | 11 | 11 | 11 | 11 | 11 | 11 | 8 |
| B$_2$O$_3$ | 10 | 10 | 10 | 10 | 10 | 10 | 10 | 10 | 10 | 10 | 10 | 10 |
| CaO | 11 | 11 | 11 | 11 | 11 | 11 | 11 | 11 | 11 | 11 | 11 | 14 |
| CuO | 1 | 1.25 | 1.5 | 1 | 1.25 | 1.75 | 3 | 6 | 8 | 8 | 8 | 0.5 |
| SnO$_2$ | 3 | 3.75 | 4.5 | 2 | 2.5 | 3 | 3.5 | 3 | 0 | 0 | 1 | 0 |
| Color | green | green | green | green | green | green | green | green | green | green | green | green |
| Total RO | 11 | 11 | 11 | 11 | 11 | 11 | 11 | 11 | 11 | 11 | 11 | 14 |
| RO/Al$_2$O$_3$ | 1 | 1 | 1 | 1 | 1 | 1 | 1 | 1 | 1 | 1 | 1 | 1.75 |
| RO/(B$_2$O$_3$ + Al$_2$O$_3$) | 0.52 | 0.52 | 0.52 | 0.52 | 0.52 | 0.52 | 0.52 | 0.52 | 0.52 | 0.52 | 0.52 | 0.78 |

| (Mol %) | G31 | G32 | G33 | G34 | G35 | G36 | G37 | G38 | G39 | G40 | G41 |
|---|---|---|---|---|---|---|---|---|---|---|---|
| SiO$_2$ | 68 | 68 | 70 | 62 | 54 | 68 | 68 | 68 | 68 | 68 | 68 |
| Al$_2$O$_3$ | 10 | 14 | 11 | 11 | 11 | 11 | 11 | 11 | 11 | 11 | 11 |
| B$_2$O$_3$ | 10 | 10 | 8 | 16 | 24 | 10 | 10 | 10 | 10 | 10 | 10 |
| CaO | 12 | 8 | 11 | 11 | 11 | 11 | 11 | 11 | 11 | 11 | 11 |
| CuO | 0.5 | 0.5 | 0.5 | 0.5 | 0.5 | 2 | 2 | 2 | 3 | 3 | 3 |
| SnO$_2$ | 0 | 0 | 0 | 0 | 0 | 1 | 1.5 | 2 | 1 | 1.5 | 2 |
| Color | green | green | green | green | green | green | green | green | green | green | green |
| Total RO | 12 | 8 | 11 | 11 | 11 | 11 | 11 | 11 | 11 | 11 | 11 |
| RO/Al$_2$O$_3$ | 1.2 | 0.6 | 1 | 1 | 1 | 1 | 1 | 1 | 1 | 1 | 1 |
| RO/(B$_2$O$_3$ + Al$_2$O$_3$) | 0.6 | 0.33 | 0.58 | 0.41 | 0.31 | 0.52 | 0.52 | 0.52 | 0.52 | 0.52 | 0.52 |

| (Mol %) | G42 | G43 | G44 | G45 | G46 | G47 | G48 | G49 | G50 | G51 |
|---|---|---|---|---|---|---|---|---|---|---|
| SiO$_2$ | 68 | 68 | 68 | 68 | 68 | 68 | 68 | 68 | 68 | 58.55 |
| Al$_2$O$_3$ | 11 | 11 | 11 | 11 | 11 | 11 | 11 | 11 | 11 | 8.53 |
| B$_2$O$_3$ | 10 | 10 | 10 | 10 | 10 | 10 | 10 | 10 | 10 | 25 |
| CaO | 11 | 11 | 11 | 11 | 11 | 11 | 11 | 11 | 11 | 7.89 |
| CuO | 4 | 0.5 | 0.5 | 1 | 1 | 1 | 2 | 2 | 2 | 1 |
| SnO$_2$ | 1 | 0.1 | 0.2 | 0.1 | 0.2 | 0.5 | 0.1 | 0.2 | 0.5 | 0.1 |
| Color | green/ phase sep | green | green | green | green | green | green | green | green | green |
| Total RO | 11 | 11 | 11 | 11 | 11 | 11 | 11 | 11 | 11 | 7.89 |
| RO/Al$_2$O$_3$ | 1 | 1 | 1 | 1 | 1 | 1 | 1 | 1 | 1 | 0.93 |
| RO/(B$_2$O$_3$ + Al$_2$O$_3$) | 0.52 | 0.52 | 0.52 | 0.52 | 0.52 | 0.52 | 0.52 | 0.52 | 0.52 | 0.24 |

| (Mol %) | G52 | G53 | G54 | G55 | G56 | G57 | G58 |
|---|---|---|---|---|---|---|---|
| SiO$_2$ | 69.3 | 68.3 | 67.3 | 69.3 | 68.3 | 69.3 | 68.3 |
| Al$_2$O$_3$ | 9.6 | 15.3 | 16 | 9.6 | 15.3 | 9.6 | 15.3 |
| B$_2$O$_3$ | | | | | | | |
| MgO | 6 | 4.4 | 16 | | | | |
| La$_2$O$_3$ | | | | 3 | 2.2 | | |
| PbO | | | | | | 6 | 4.4 |
| CaO (carbonate) | 15 | 10.9 | | 15 | 10.9 | 15 | 10.9 |
| SnO$_2$ | 0.1 | 0.1 | | 0.1 | 0.1 | 0.1 | 0.1 |
| CuO | 1 | 1 | 1 | 1 | 1 | 1 | 1 |

TABLE 5-continued

Exemplary Green Tinted Glass Compositions

| Color | green | green | green | green | green | green | green |
|---|---|---|---|---|---|---|---|
| L | 92.72 | 93.93 | 91.71 | 92.07 | 93.44 | 92.17 | 93.67 |
| a | −3.48 | −2.24 | −5.92 | −3.69 | −2.17 | −4.58 | −6.85 |
| b | 3.06 | 2.8 | 1.16 | 2.71 | 3.05 | 13.63 | 8.46 |
| Total RO | 21 | 15.3 | 16 | 15 | 10.9 | 15 | 10.9 |
| RO/$Al_2O_3$ | 2.19 | 1 | 1 | 1.56 | 0.71 | 1.56 | 0.71 |
| RO/($B_2O_3$ + $Al_2O_3$) | 2.19 | 1 | 1 | 1.56 | 0.71 | 1.56 | 0.71 |

Figure 5:
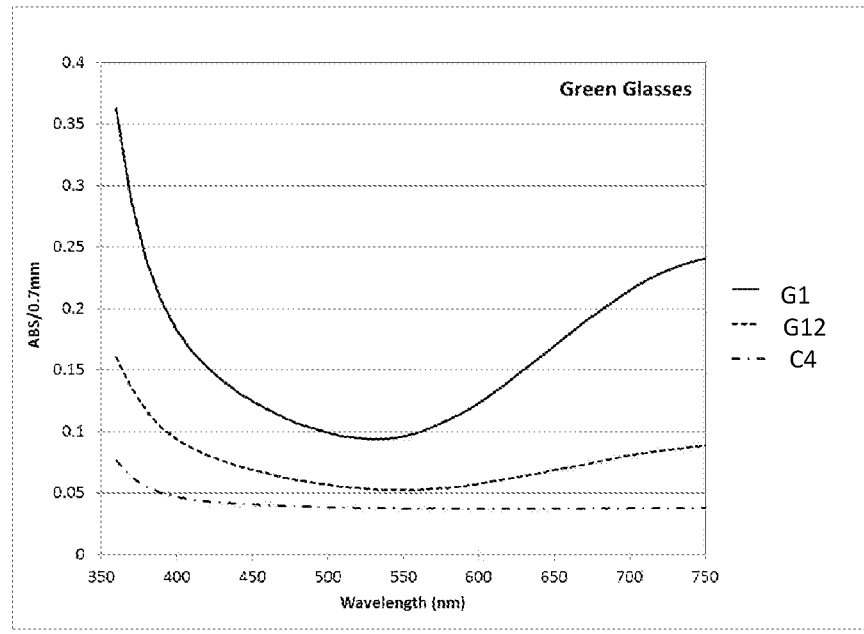

FIG. 5 is a graph illustrating the absorbance spectrum of green-tinted glass compositions G1 and G12. As can be seen in FIG. 5, the glass compositions G1 and G12 had an absorbance minimum between about 495 to about 570 nm, which provides a greenish coloration.

Example 4

Substantially colorless glass was prepared from a batched composition C4, including in mol %: 68.9 $SiO_2$, 10.5 $Al_2O_3$, 9.9 $B_2O_3$, 10.1 SrO (as strontium carbonate), 0.1 $SnO_2$, 1 CuO, and 0.5 C (as charcoal). L*a*b* color coordinates and transmission were measured on a sample 0.7 mm+/−0.1 mm in thickness as: L*=96.67, a*=−0.08, b*=0.44. The absorbance spectrum of substantially colorless glass C4 is shown in FIGS. 3, 4, and 5. C4 had an absorbance of less than 0.08 and an absorbance delta (e.g., a difference between maximum and minimum absorbance) of less that about 0.01 at wavelengths from about 400 to about 750 nm, which provides a substantially colorless composition.

Example 5

Red tinted glass compositions shown in Table 7 were formed as noted above, except that coloration was provided by reheating (e.g., striking-in) the glass to a temperature within +/−50 deg C. of the annealing point for a time of 0.5 hours to 24 hours. after the glass compositions were annealed. The amounts of the various components are given in Table 7 as mol % on an oxide basis. Table 7 also includes L*a*b* color coordinates for selected glass compositions having thicknesses of 0.7 mm+/−0.1 mm, before the reheating process was performed. In addition, Table 6 provides total molar amounts of included alkaline earth metal oxides (RO) and ratios of the total RO amounts to molar amounts of $Al_2O_3$ and ($Al_2O_3$+$B_2O_3$).

TABLE 7

Exemplary Red Strike-in Glass Compositions

| (Mol %) | RS1 | RS2 | RS3 | RS4 |
|---|---|---|---|---|
| $SiO_2$ | 67.3 | 68.95 | 68.95 | 68.3 |
| $Al_2O_3$ | 9.6 | 10.49 | 10.49 | 9.6 |
| $B_2O_3$ | | 9.89 | | |
| CaO (carbonate) | 22 | 10.09 | 13.04 | |
| SrO (carbonate) | | | | 15 |
| BaO (carbonate) | | | 6.94 | 6 |
| $SnO_2$ | 0.1 | 0.1 | 0.08 | 0.1 |
| CuO | 1 | 1 | 1 | 1 |
| C | 0.5 | 0.5 | | |
| Color | colorless/ strike- in red | colorless/ strike- in red | colorless/ strike- in red | colorless/ strike- in red |
| L* | 96.32 | 96.64 | 94.47 | 96.47 |
| a* | −0.36 | −0.09 | −0.34 | −0.24 |
| b* | 0.41 | 0.37 | 0.14 | 0.44 |

TABLE 7-continued

Exemplary Red Strike-in Glass Compositions

| (Mol %) | RS1 | RS2 | RS3 | RS4 |
|---|---|---|---|---|
| Total RO | 22 | 10.09 | 19.98 | 21 |
| RO/$Al_2O_3$ | 2.29 | 0.96 | 1.90 | 2.19 |
| RO/($B_2O_3$ + $Al_2O_3$) | 2.29 | 0.5 | 1.90 | 2.19 |

Figure 6:
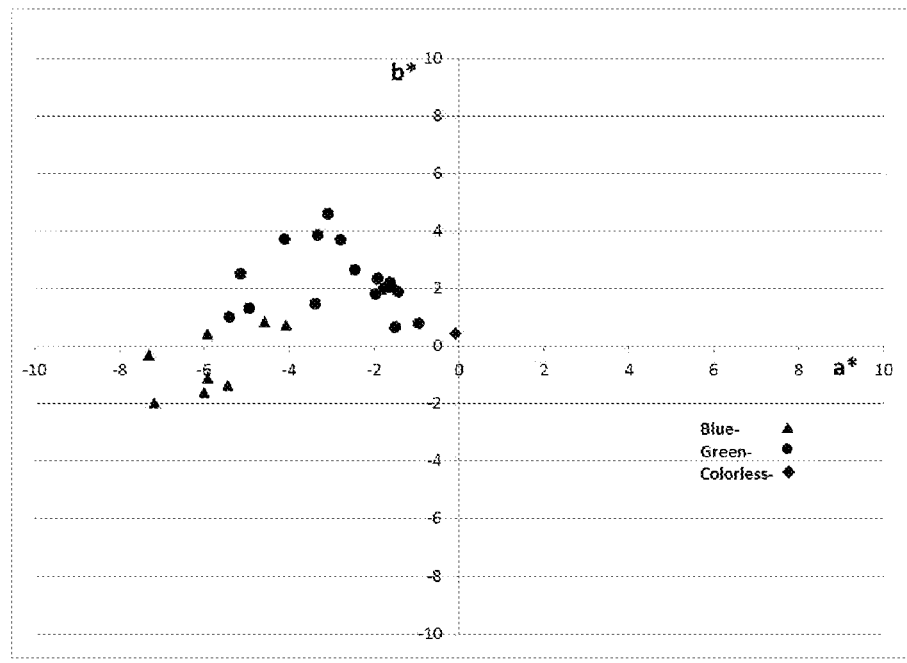
FIG. 6 is a graph showing color coordinates for blue, green and colorless glasses.

FIG. 6 is a graph showing color coordinates for blue, green and colorless glasses. As shown in FIG. 6, the blue glasses had a* coordinates ranging from about −4 to about −7.5, and b* coordinates ranging from about −2 to about 1. The green glasses had a* coordinates ranging from about −5.5 to about −1, and b* coordinates ranging from about 1 to about 5. The colorless glass had a* and b* coordinates of about (0, 0.25).

Figure 7:
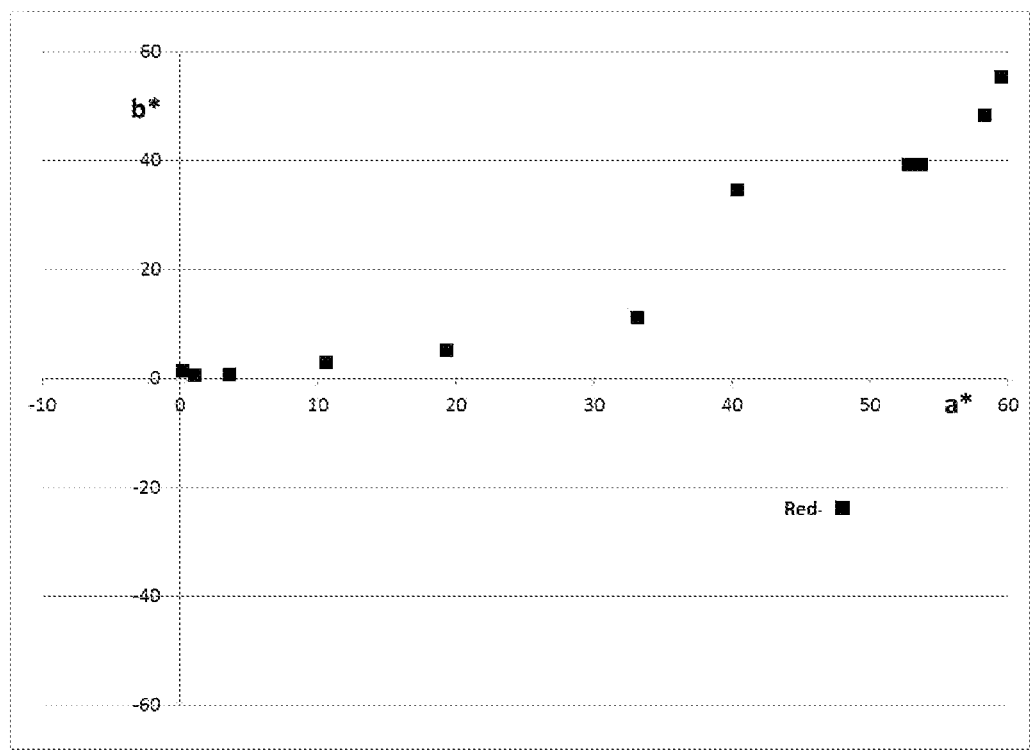
FIG. 7 is a graph showing color coordinates for red glasses.

FIG. 7 is a graph showing color coordinates for red glasses. Referring to FIG. 7, the red glasses had a* coordinates ranging from about 1 to about 60, and b* coordinates ranging from about 0 to about 55.

It will be apparent to those skilled in the art that various modifications and variations can be made without departing from the spirit or scope of the invention. Accordingly, the invention is not to be restricted except in light of the attached claims and their equivalents.

What is claimed is:

1. A glass composition comprising, on an oxide basis:
   about 60 mol % to about 80 mol % $SiO_2$;
   about 6 mol % to about 22 mol % $Al_2O_3$;
   1 mol % to about 25 mol % $B_2O_3$;
   >0 mol % to about 22 mol % CaO;
   about 7 mol % to about 25 mol % of at least one alkaline earth oxide selected from the group consisting of MgO, CaO, SrO, BaO, and combinations thereof;
   about 0.5 mol % to about 20 mol % CuO;
   0 mol % to about 6 mol % $SnO_2$, SnO, or a combination thereof;
   0 mol % to about 1 mol % C;
   0 mol % to about 5 mol % $La_2O_3$; and
   0 mol % to about 10 mol % PbO;
   wherein the glass composition is substantially free of alkali metal.

2. The glass composition of claim 1, comprising at least one selected from the group consisting of:
   >0 mol % to about 22 mol % MgO;
   >0 mol % to about 22 mol % SrO;
   >0 mol % to about 22 mol % BaO;
   >0 mol % to about 5 mol % $La_2O_3$;
   >0 mol % to about 10 mol % PbO; and
   a combination thereof.

3. The glass composition of claim 1, wherein the composition is substantially free of redox agents other than $SnO_2$ and C.

4. The glass composition of claim 1, further comprising colloidal Cu metal.

5. The glass composition of claim 1, comprising about 1 mol % to about 8 mol % CuO.

6. The glass composition of claim 1, comprising about 0.5 mol % to about 4 mol % CuO.

7. The glass composition of claim 1, wherein a glass sheet formed from the glass composition and having a thickness of 0.7 mm comprises a blue tint and a local minimum in visible light absorbance between 450 nm and 540 nm.

8. The glass composition of claim 7, wherein the glass sheet has an absorbance of greater than 0.15 for visible wavelengths of less than about 380 nm and greater than about 600 nm.

9. The glass composition of claim 1, wherein a glass sheet formed from the composition and having a thickness of 0.7 mm comprises a green tint and a local minimum in visible light absorbance between 495 nm and 570 nm.

10. The glass composition of claim 9, wherein the glass sheet has an absorbance of greater than 0.15 for visible wavelengths of less than about 425 nm and greater than about 640 nm.

11. The glass composition of claim 1, wherein a glass sheet formed from the composition and having a thickness of 0.7 mm comprises a red tint, a local maximum in visible light absorbance between 550 nm and 570 nm, and a lower absorbance at wavelengths between 600 nm and 700 nm than at wavelengths between 350 nm and 550 nm.

12. The glass composition of claim 11, wherein the glass sheet has an absorbance of greater than 0.08 for visible wavelengths of less than about 575 nm.

13. A laminate glass article comprising:
a glass core layer; and
a glass cladding layer disposed on a first side of the core layer,
wherein at least one of the core layer or the cladding layer comprises the glass composition of claim 1.

14. The laminated glass article of claim 13, wherein:
the core layer comprises the glass composition;
the core layer has a different tint than the cladding layer; and
the cladding layer comprises a second glass composition comprising, on an oxide basis:
 about 45 mol % to about 80 mol % $SiO_2$;
 about 6 mol % to about 22 mol % $Al_2O_3$;
 0 mol % to about 25 mol % $B_2O_3$;
 about 7 mol % to about 25 mol % of at least one alkaline earth oxide selected from the group consisting of MgO, CaO, SrO, BaO, and a combination thereof;
 about 0.5 mol % to about 20 mol % CuO;
 0 mol % to about 6 mol % $SnO_2$, SnO, or a combination thereof;
 0 mol % to about 1 mol % C;
 0 mol % to about 5 mol % $La_2O_3$; and
 0 mol % to about 10 mol % PbO.

15. The laminate glass article of claim 13, wherein the cladding layer comprises a textured surface.

16. The laminate glass article of claim 13, wherein;
the core layer comprises the composition;
the glass article further comprises a second glass cladding layer disposed on a second side of the core layer opposite the first side; and
each of the first cladding layer and the second cladding layer has a lower coefficient of thermal expansion than the core layer.

17. The laminate glass article of claim 13, wherein:
the core layer comprises the composition;
the glass article further comprises a second glass cladding layer disposed on a second side of the core layer opposite the first side; and
each of the first and second cladding layers is substantially free of a tinting agent.

18. The laminate glass article of claim 13, wherein:
the core layer comprises the composition;
the glass article further comprises a second glass cladding layer disposed on a second side of the core layer opposite the first side; and
at least one of the first and second cladding layers comprises a tinted alkali-containing glass.

19. A consumer electronic device comprising the laminate glass article of claim 13.

20. A glass composition comprising, on an oxide basis:
about 60 mol % to about 80 mol % $SiO_2$;
about 6 mol % to about 22 mol % $Al_2O_3$;
0 mol % to about 25 mol % $B_2O_3$;
>0 mol % to about 22 mol % CaO;
about 7 mol % to about 25 mol % of at least one alkaline earth oxide selected from the group consisting of MgO, CaO, SrO, BaO, and combinations thereof;
about 0.5 mol % to about 20 mol % CuO;
0 mol % to about 6 mol % $SnO_2$, SnO, or a combination thereof;
0 mol % to about 1 mol % C;
0 mol % to about 5 mol % $La_2O_3$; and
0 mol % to about 10 mol % PbO;
wherein the glass composition comprises colloidal Cu metal and is substantially free of alkali metal.

* * * * *